United States Patent [19]

Rosen et al.

[11] 4,242,241

[45] Dec. 30, 1980

[54] METHOD FOR MAKING A SLURRY CONTAINING PARTICULATE MATTER AND FIBERS FOR A PREFORMED INSULATION PRODUCT

[75] Inventors: Murray Rosen; Alan R. Koenig, both of St. Petersburg; John D. Copham, Seminole, all of Fla.

[73] Assignee: The Celotex Corporation, Tampa, Fla.

[21] Appl. No.: 7,101

[22] Filed: Jan. 29, 1979

Related U.S. Application Data

[62] Division of Ser. No. 847,165, Oct. 31, 1977, Pat. No. 4,168,919.

[51] Int. Cl.$^3$ .............................. C08L 1/00; C08L 3/00
[52] U.S. Cl. ........................................ 260/17.2; 260/9; 118/303; 366/173; 366/66; 366/67; 366/186
[58] Field of Search .......................... 260/17.2; 260/9

[56] References Cited

U.S. PATENT DOCUMENTS

| | | | |
|---|---|---|---|
| 2,282,479 | 5/1942 | Johnston | 428/403 X |
| 3,408,316 | 10/1968 | Mueller et al. | 260/17.2 |
| 3,558,591 | 1/1971 | Yendrek | 260/17.2 |
| 3,639,276 | 2/1972 | Mueller | 252/62 |
| 3,684,558 | 8/1972 | Fujii et al. | 427/221 X |
| 3,732,177 | 5/1973 | Tisdale et al. | 260/17.2 |
| 3,878,142 | 4/1975 | Tisza | 260/17.2 |
| 3,922,241 | 11/1975 | Barker et al. | 260/17.2 |
| 3,967,005 | 6/1976 | Cattoneo | 427/214 X |
| 3,991,225 | 11/1976 | Blouin | 427/214 X |
| 4,155,884 | 5/1979 | Hughes | 260/17.2 X |
| 4,168,919 | 9/1979 | Rosen et al. | 366/67 |

Primary Examiner—Melvyn I. Marquis
Attorney, Agent, or Firm—James W. Grace

[57] ABSTRACT

A method for making a slurry containing particulate matter and fibers for a preformed insulation product comprises mixing dry particulate matter with a binder which is a liquid containing dispersed fibers. An apparatus suitable for practicing the method comprises a means for disposing the particulate matter in the form of a falling curtain and a means for spraying the binder on the particulate matter.

3 Claims, 3 Drawing Figures

U.S. Patent     Dec. 30, 1980     4,242,241
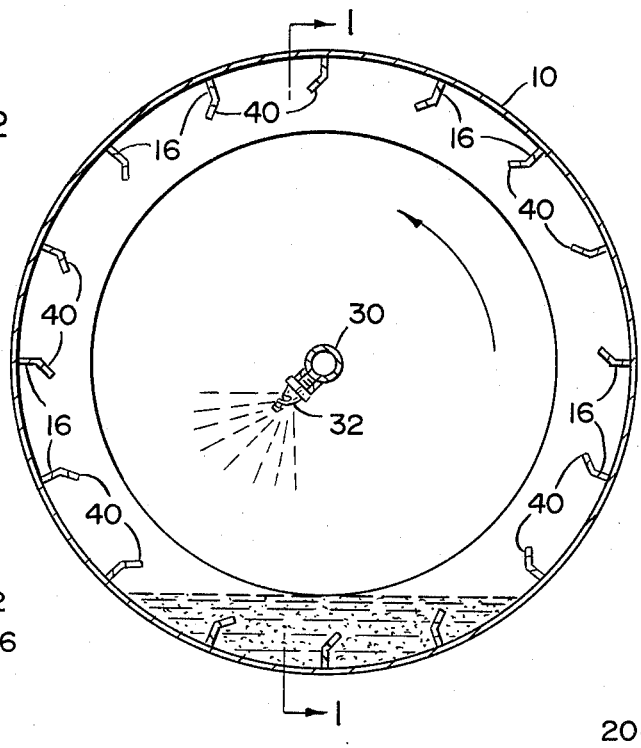
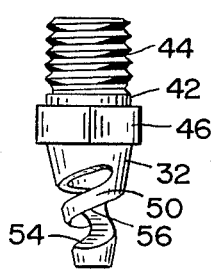
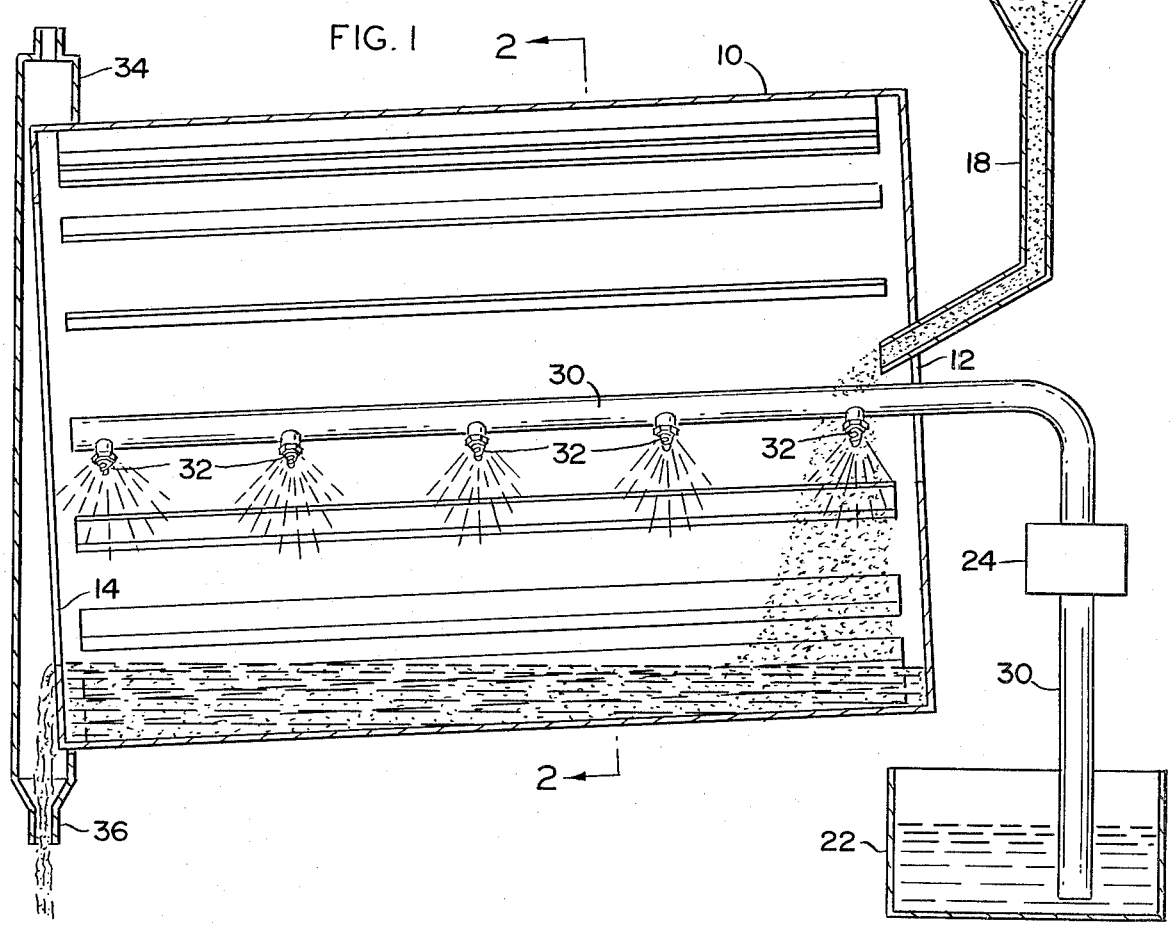

METHOD FOR MAKING A SLURRY CONTAINING PARTICULATE MATTER AND FIBERS FOR A PREFORMED INSULATION PRODUCT

This is a division of application Ser. No. 847,165, filed Oct. 31, 1977 now U.S. Pat. No. 4,168,919.

BACKGROUND OF THE INVENTION

1. Field of the Invention.

The method of the invention has been found to be useful in the field of heat insulation products, although it can be used wherever a liquid binder with a reinforcing fiber must be dispersed through particulate material.

2. Description of the prior art.

Heat insulation products are well known and are widely used in industry. In one form the heat insulation product is used as a preformed unit which encloses pipes carrying hot or cold fluids. Much pipe insulation is used in chemical plants, such as refineries, to conserve energy.

In addition, the heat insulation material may be in the form of blocks or panels which can be secured to the walls of areas requiring heat or cold insulation.

In the past the heat insulation has been made by a molding process in which a slurry of particulate material, such as perlite and liquid inorganic binder is poured into molds and dried to harden the binder.

The slurry has been made by mixing together perlite particles and a liquid inorganic binder in a large rotating drum or vat. To give additional strength to the finished heat insulation products, various fibers have been incorporated into the slurry. The general method of incorporating the fibers has been to mix the particulate matter and the fibers together in dry form and then add the liquid binder. Reference may be had to any of the following patents for details of mixing the particulate matter and the liquid binder:

U.S. Pat. No. 3,367,871 issued on Feb. 6, 1968 to A. P. Mueller and Beverly Asher.

U.S. Pat. No. 3,408,316 issued on Oct. 29, 1968 to the above inventors.

U.S. Pat. No. 3,639,276 issued on Feb. 1, 1972 to the above inventors.

All the above patents are assigned to The Celotex Corporation of Tampa, Florida.

When this method of making the slurry has been followed, there is often a poor distribution of the fibers throughout the slurry. Usually, the fiber dispersion is very nonuniform. Part of the problem starts with the fact that the fibers come in long strands of many filaments. The strands are chopped into shorter lengths and the short lengths of strands are dumped into the mixer with the particulate matter.

In many instances the strands do not break apart into their individual filaments but remain agglomerated even when tumbled with the particulate matter. Thus, for a given number of strands of filaments, the strength imparted to the final heat insulation product is substantially lessened compared to a heat insulation product in which the individual filaments of the strands are uniformly dispersed in the slurry.

The slurry is then poured into molds which are heated to dry the slurry and set the binder to form a molded heat insulation product.

SUMMARY OF THE INVENTION

The invention is directed to a novel method and apparatus for making a preformed insulation product from a slurry containing particulate matter and fibers. Basically, the strands of fibers are mixed with the liquid binder in which they are broken apart into their individual fibers which are then uniformly dispersed throughout the liquid binder. The liquid binder is the sprayed onto the particulate matter so that a uniform mixture of dry matter and liquid binder forms a slurry which can later be dried in molds to form the heat insulation product.

Care must be taken in the spraying process to insure that the fibers do not plug up the spray nozzles and cause the system to shut down.

Thus, it is an object of the present invention to make a preformed heat insulation product which has fibers uniformly distributed throughout the product.

It is a further object of the present invention to produce a preformed heat insulation product by a novel method of distributing fibers throughout the product.

It is yet another object of the present invention to produce a preformed heat insulation product on a novel apparatus.

Other object and advantages of the present invention will become apparent to those skilled in the art from the following description when considered with the drawing, in which like numerals indicate like elements and in which:

FIG. 1 is a cross-sectional view of the apparatus of the invention;

FIG. 2 is a cross-sectional view of the apparatus of FIG. 1 taken along lines 2—2 of FIG. 1 and FIG. 3 is a plan view of a nozzle shown in FIGS. 1 and 2.

Turning now to the drawings, FIG. 1 is a cross-sectional view of a portion of the apparatus used in the invention. A drum 10 is arranged to revolve on a slightly tilted axis (not shown) so that a slurry made therein will gradually move from an inlet end 12 to an outlet end 14. Drum 10 may be made of steel or other sheet material in the form of a hollow cylinder. A series of vanes 16 are secured to the inside surface of drum 10 and extend inwardly from its inside surface to form a series of inwardly extending shelves. The vanes 16 serve to keep the dry material and the subsequently formed slurry in a constant state of agitation so that an intimate and uniform mixing action occurs. The effect of the vanes is to form a uniform curtain of falling separated particles as the drum rotates. If desired, each of vanes 16 may have an outer edge portion bent to form a sort of pocket for better control of the mixing operation.

At the inlet end 12 there is a dry material feed chute 18 through which the dry material is fed into drum 10. For convenience, a conical spout or hopper 20 is attached to the upper end of feed chute 18 to facilitate feed of the dry ingredients.

A liquid binder holding tank 22 holds a liquid binder including fibrous material in a state of agitation by means of an agitator (not shown). The agitator may be a screw propeller on a shaft attached to a fractional horsepower electric motor. A pump 24 is placed in the feed line 30 for the introduction of liquid binder into drum 10.

A series of nozzles 32 are tapped into feed line 30 to provide a spray means for applying liquid binder and fibrous material to the other ingredients.

At the outlet end 14 of drum 10 there is a discharge housing 34 which receives the slurry formed in the drum 10. Housing 34 has a discharge spout 36 which allows the slurry to drop into a hopper (not shown).

The drum 10 may be rotated at a suitable speed by a mechanism (not shown). The mechanism may be a rotating belt, a gear arrangement or a pair of rotating rollers which support the drum. The nature of the specific rotational mechanism is not a critical part of the invention and any number of suitable mechanisms will occur to those skilled in the art.

The operation of the apparatus to make a slurry of particulate material with a liquid binder may be explained most readily by reference to FIG. 1.

The principal raw material for the manufacture of the new thermal insulation is perlite ore, a naturally occurring siliceous, vitreous mineral, generally believed to be of volcanic origin and containing a small amount of entrapped moisture. Large deposits of raw perlite ore are found in many countries of the world. In the United States there are deposits of suitable quality for the purpose in Colorado, Arizona, New Mexico, Nevada and other western states. For economy in transportation cost the dense raw ore is usually shipped to the plant location where the expanded perlite is to be used and the expansion process is carried out at the point of manufacture.

Before the raw perlite is subjected to the expanding process, it is first ground to nominal 100 mesh size. A typical specification for the sieve analysis of suitably pulverized perlite ore to be used in making the new insulation is as follows:

| A.S.T.M. Standard Sieve No. | Accumulative Percent Retained by Weight | |
|---|---|---|
| | Min. | Max. |
| 50 | — | 6 |
| 100 | 55 | 75 |
| 200 | 95 | 100 |

The expanding process consists of subjecting the pulverized perlite ore to heat of about 1600° to 2000° F. under controlled conditions in an expanding furnace. Under this heat processing the minute perlite ore particles expand or "pop" into cellular, rigid, glassy, generally spherical individual particles of extremely low bulk density and high thermal insulation capability. This invention is directed to converting this loose unbonded mass of fragile, minute, cellular, glassy spheres into a rigid, strong, monolithic molded insulation.

For the manufacture of the new thermal insulation, an expanded cellular perlite of very low bulk (loose fill) density, in the range of 1.8 to 3.5 pounds per cubic foot is used. The best combination of properties of the finished molded product is obtained when the bulk density of the expanded perlite is in the range of 2.3 to 2.8 pounds per cubic foot. The bulk density can be maintained within this preferred range by controlling the sieve analysis of the ore and the temperature and rate of heating in the expansion process.

Expanded perlite within the limits of the following specifications for sieve analysis gives particularly good results in the manufacture of the new insulation.

| A.S.T.M. Standard Sieve No. | Percent Retained by Volume | |
|---|---|---|
| | Min. | Max. |
| 20 | 3 | 10 |
| 30 | 15 | 30 |
| 50 | 45 | 60 |
| 100 | 2 | 5 |
| Passing No. 100 Sieve | 5 | 15 |

Thus, it will be seen that from 60% to 90% by volume of the expanded perlite passes the No. 20 test sieve and is retained on the No. 50. test sieve.

The composite binder which is used to bond together the cellular expanded perlite particles and other finely-divided and fibrous mineral components of the new molded insulation is a water dispersion or colloidal solution of the binder materials. This binder dispersion is separately prepared instead of merely mixing the binder ingredients with the mineral insulation materials.

A typical composition for the binder solution which is suitable for the purpose is the following:

| | Percent by Weight of Solids |
|---|---|
| Bentonite clay, High Swelling | 53% |
| Starch low and stable viscosity Modified Starch (acetylated corn starch) | 33% |
| Phenolic resin (ASTM D-115, 7) | 11% |
| Silicone | 3% |
| | 100% |
| Water - 140% of total solids. | |

While a particular binder formulation has been set forth, variations and changes in ingredients and proportions thereof can be made without departing from the basic teachings of this invention. The particular formation per se obviously does not form essential teaching of this invention.

For more detailed discussion of the binder ingredients reference may be had to U.S. Pat. No. 3,408,316 issued on Oct. 29, 1968 to A. P. Mueller and Beverly Asher, the teachings of which are incorporated into this application as if they were fully set forth herein. The details of the binder ingredients as set forth in the cited patent are applicable to this invention except that an added amount of nylon fiber is mixed with the liquid binder. The nylon fiber is added in the form of $\frac{1}{2}''$ six Denier fiber in strands of 140 filaments per strand.

While strands of nylon fiber of this type have been found to be of the most practical and commercial use, other organic or inorganic fibers may be used. Such other fibers may be dacron, glass, polypropylene, or other synthetic textile fibers.

The binder and fiber mixture is added to tank 22 wherein they are kept in agitation for uniform dispersion by a mixer which may be of the high speed type; i.e., Cowles or Hockemeyer type, which are commercially available.

The perlite is dropped into hopper 20 and through feed chute 18 into drum 10. A feed unit (not shown) may be in the form of a screw conveyor with a rate control mechanism. Pump 24 pumps the liquid binder from tank 22 through nozzles 32 to the dry perlite in the drum 10. The feed unit and rate of the pump 24 are adjusted so that the amount of perlite is about 80% by weight of dry solids of the solids in the final slurry and the liquid binder with the nylon fiber is about 20% by weight of the dry solids in the slurry.

Drum 10 is kept in rotation so that the sprayed binder from nozzles 32 can uniformly coat the perlite particles and the nylon fibers can be dispersed uniformly in the slurry.

After thorough mixing the slurry flows out of discharge spout 36 from which it is brought to molds and then baked to harden and set the binder.

Reference may be had to FIG. 2 which is a cross-sectional view of the apparatus of FIG. 1 taken along line 2—2 and having the discharge housing 34 removed. It can be seen that vanes 16 are uniformly spaced around the interior surface of drum 10 with their inwardly facing edges 40 offset to form a pocket to receive the dry ingredients at the inlet end 12 and the slurry as it progresses toward the outlet end 14.

As drum 10 rotates the dry perlite material near feed inlet 12 is raised up on vanes 16 and continues its upward journey until the respective one of vanes 16 carrying the perlite crosses over the center point at the top of the rotational phase. The perlite particles then spill over the edge of vane 16 and fall down in the form of a uniform falling curtain.

As the perlite and binder mix, there is formed a more uniform slurry while the slurry proceeds down the slope of the bottom of the drum 10 toward discharge outlet 36. It should be realized that throughout the interior of the drum there will be a continuous curtain of material falling off vanes 16. The material becomes more uniform and the binder is better distributed as the drum continues to rotate.

The slurry may be discharged from spout 36 into a hopper which is then unloaded into molds. The molds are baked in an oven at known temperatures to effect a cure of the heat insulation material.

FIG. 3 shows the nozzle 32 in greater detail. Nozzle 32 comprises a hollow tubular member 42 with external threads 44 adapted to be received in tapped holes in feed line 30. A hexagonal portion 46 is formed in the tubular member 42 about halfway along its surface so that wrench or other tool can grasp the member 42 to tighten it into a tapped hole in feed line 30. A helically-shaped vane 50 extends axially from the threaded tubular member 42. The vane 50 spirals inwardly and its inner wall 54 has an inner axial taper to form a bore 56 in a conical shape so that the cross-sectional area of the bore is reduced in the direction of flow through the nozzle. In its action the nozzle causes a uniform sheet of binder under pressure to be peeled off by vane 50. In addition to forming a conical sheet of fluid to be hurled outwardly and downwardly, the flat surface of inner wall 54 also serves to further tear apart any bundles of fibers which may remain after leaving the nozzle 32. The fibers are now in separate filaments and not in strands or bundles. The cone angle may vary, but a cone angle of 102° has been found to be adequate. In addition, the nozzles can provide a hollow or full cone of distribution. In the preferred embodiment, a full cone has been used.

It should be further noted that the nozzle 32 is hollow and thus plugging of the nozzle by a buildup of fibers is minimized. There is a clear path for the binder to flow through.

The nozzle has been described in U.S. Pat. No. 2,804,341 issued to John U. Bete and assigned to Bete Fog Nozzles, Inc. These nozzles ae sold commercially in various sizes having orifice diameters of between 3/32" and ½" for hollow cone cnfigurations.

There is thus described an apparatus and method by whichaa fiber component can be uniformly spread through a heat insulating product for greatest strength at minimum usage of fibers.

We claim:

1. A method of making a preformed insulation product from a slurry containing particulate matter, binder and fibers comprising making a liquid binder, putting chopped strands of fibers into said liquid binder, agitating said liquid binder to separate at least some of said strands into individual fibers, forcing said liquid binder and fibers under pressure through a hollow tubular member against an inwardly closing helical vane to form a conically expanding spray of binder and fibers, breaking up any remaining strands of fibers into individual fibers, forming a falling curtain of separated particulate matter and directing said conically expanding spray of binder and fibers against said falling curtain of separated particulate matter to form a uniform slurry of particles, binder and fibers, putting said slurry into molds and heating said molds to a temperature and for a sufficient period of time to make a preformed insulation product.

2. A method of making a preformed insulation product from a slurry as set forth in claim 1 in which said particulate material is perlite.

3. A method of making a preformed insulation product from a slurry as set forth in claim 1 in which said fiber is nylon.

* * * * *